United States Patent
Arieli et al.

(10) Patent No.: US 11,482,214 B1
(45) Date of Patent: Oct. 25, 2022

(54) HYPOTHESIS GENERATION AND SELECTION FOR INVERSE TEXT NORMALIZATION FOR SEARCH

(71) Applicant: Amazon Technologies, Inc., Seattle, WA (US)

(72) Inventors: Natali Arieli, Tel Aviv (IL); Eran Fainman, Tel Aviv (IL); Yochai Zvik, Modiin (IL); Yaniv Ben-Yehuda, Tel Aviv (IL)

(73) Assignee: Amazon Technologies, Inc., Seattle, WA (US)

( * ) Notice: Subject to any disclaimer, the term of this patent is extended or adjusted under 35 U.S.C. 154(b) by 250 days.

(21) Appl. No.: 16/711,914

(22) Filed: Dec. 12, 2019

(51) Int. Cl.
| | |
|---|---|
| G10L 15/22 | (2006.01) |
| G10L 15/00 | (2013.01) |
| G10L 15/197 | (2013.01) |
| G06F 16/9538 | (2019.01) |
| G06N 7/00 | (2006.01) |
| G06N 20/00 | (2019.01) |

(52) U.S. Cl.
CPC ........ G10L 15/197 (2013.01); G06F 16/9538 (2019.01); G06N 7/005 (2013.01); G06N 20/00 (2019.01); G10L 15/22 (2013.01); *G10L 2015/223* (2013.01)

(58) Field of Classification Search
CPC .............................. G10L 15/193; G10L 15/22
See application file for complete search history.

(56) References Cited

U.S. PATENT DOCUMENTS

| 5,970,449 A * | 10/1999 | Alleva ................. | G06F 40/279 |
| | | | 704/235 |
| 7,729,913 B1 * | 6/2010 | Lee ........................ | G10L 15/26 |
| | | | 704/254 |
| 9,472,196 B1 * | 10/2016 | Wang ..................... | G06F 3/167 |
| 9,934,777 B1 * | 4/2018 | Joseph ................. | G10L 15/063 |
| 2006/0069545 A1 * | 3/2006 | Wu ....................... | G06F 40/205 |
| | | | 704/8 |
| 2008/0270138 A1 * | 10/2008 | Knight .................. | G06F 16/434 |
| | | | 704/E15.045 |
| 2009/0157385 A1 * | 6/2009 | Tian ....................... | G06F 40/40 |
| | | | 704/9 |
| 2011/0145214 A1 * | 6/2011 | Zhang ................... | G06F 16/957 |
| | | | 707/706 |

(Continued)

OTHER PUBLICATIONS

Ju et al., "A Language-Modeling Approach to Inverse Text Normalization and Data Cleanup for Multimodal Voice Search Applications", ISCA, 2008, pp. 2179-2182.

(Continued)

*Primary Examiner* — Jialong He
(74) *Attorney, Agent, or Firm* — Nicholson De Vos Webster & Elliott LLP

(57) ABSTRACT

Techniques for speech-to-text hypothesis generation and hypothesis selection described. A text input representing at least part of a voice recording is received from a speech-to-text component. A first text alternative is generated using a finite state transducer based at least in part on the text input. A hypothesis from a hypothesis set is selected using a language model that includes probabilities for sequences of words, the hypothesis set including the text input and the first text alternative. A selected hypothesis text associated with the selected hypothesis is sent to a search engine.

20 Claims, 6 Drawing Sheets

(56) References Cited

U.S. PATENT DOCUMENTS

| | | | | |
|---|---|---|---|---|
| 2012/0232901 | A1* | 9/2012 | Kadirkamanathan | ........................ G10L 15/005 704/240 |
| 2014/0149108 | A1* | 5/2014 | Wang | .................... G06F 40/216 704/9 |
| 2014/0156260 | A1* | 6/2014 | Zweig | ................... G06F 40/237 704/9 |
| 2017/0147585 | A1* | 5/2017 | Kleindienst | ............ G06N 20/00 |
| 2017/0154033 | A1* | 6/2017 | Lee | ......................... G10L 15/16 |
| 2017/0186432 | A1* | 6/2017 | Aleksic | ............... G10L 15/1815 |
| 2019/0180741 | A1* | 6/2019 | Park | ......................... G10L 15/22 |
| 2019/0278841 | A1* | 9/2019 | Pusateri | .................. G10L 15/26 |
| 2020/0160838 | A1* | 5/2020 | Lee | ........................ G10L 15/005 |
| 2021/0064822 | A1* | 3/2021 | Velikovich | ............. G06F 40/295 |

OTHER PUBLICATIONS

Pusateri et al., "A Mostly Data-driven Approach to Inverse Text Normalization", Interspeech 2017, Aug. 20-24, 2017, pp. 2784-2788.

Sak et al., "Written-Domain Language Modeling for Automatic Speech Recognition", Conference: Interspeech 2013, Aug. 2013, 5 pages.

Shugrina, Maria, "Formatting Time-Aligned ASR Transcripts for Readability", The 2010 Annual Conference of the North American Chapter of the ACL, Jun. 2010, pp. 198-206.

* cited by examiner

HYPOTHESIS GENERATION AND SELECTION FOR INVERSE TEXT NORMALIZATION FOR SEARCH

BACKGROUND

Users are more frequently using computing devices and systems through a voice-based interface. One might use a voice-based interface to perform various tasks such as searching the internet, purchasing a product, playing a song, or launching an application. Often, voice-based interfaces serve as a frontend to a text-based interface. For example, a user's spoken-form request (e.g., an audio recording of the command "play song A") is converted into a textual-form (e.g., the text "play song A") for downstream processing such as by a search engine.

BRIEF DESCRIPTION OF DRAWINGS

Various embodiments in accordance with the present disclosure will be described with reference to the following drawings.

DETAILED DESCRIPTION

The present disclosure relates to methods, apparatus, systems, and non-transitory computer-readable storage media for speech-to-text hypothesis generation and hypothesis selection. Voice-based interfaces often serve as a frontend to a text-based interface. To do so, a speech recognition component often converts an audio file containing, for example, a spoken-form voice command into its written equivalent. Such a written equivalent, however, often lacks contextual nuances that a user would otherwise introduce were they inputting the command in written form. Meanwhile, text-based interfaces are often designed around the intricacies that users typically introduce in written form. For example, a user searching for mattresses might textually search for 'mattress with 10-inch depth' while that same user searching for televisions might textually search for '50" televisions' (with the double-quote indicating inches). Based on such nuances in user behavior, a search engine might return more relevant results when the term "inch" is used as a degree of measure in mattress searches and also return more relevant results when the double-quote is used as a degree of measure in television searches. In the context of a voice-based interface, however, when the user speaks those same queries the representation of the term inch is lost—speaking the phrase '50" television' sounds the same as speaking the phrase '50-inch television.'

Disclosed herein are techniques for addressing such challenges—e.g., how to interface voice-originated requests to text-based interfaces by identifying a textual form from a voice-based input that more closely matches what users typically enter when using a text-based interface. According to some embodiments, a hypothesis generator creates multiple written form hypotheses from the textual output of a speech recognition component. The hypothesis generator can use Finite State Transducer (FST) transformers to generate the various hypotheses. A hypothesis selector then scores each of the generated hypotheses to select one for output to a downstream process (e.g., a search engine). The hypothesis selector uses a language model to score the various hypotheses. The disclosed techniques demonstrate a marked accuracy improvement over prior inverse text normalization approaches and can be applied to any language.

Figure 1:
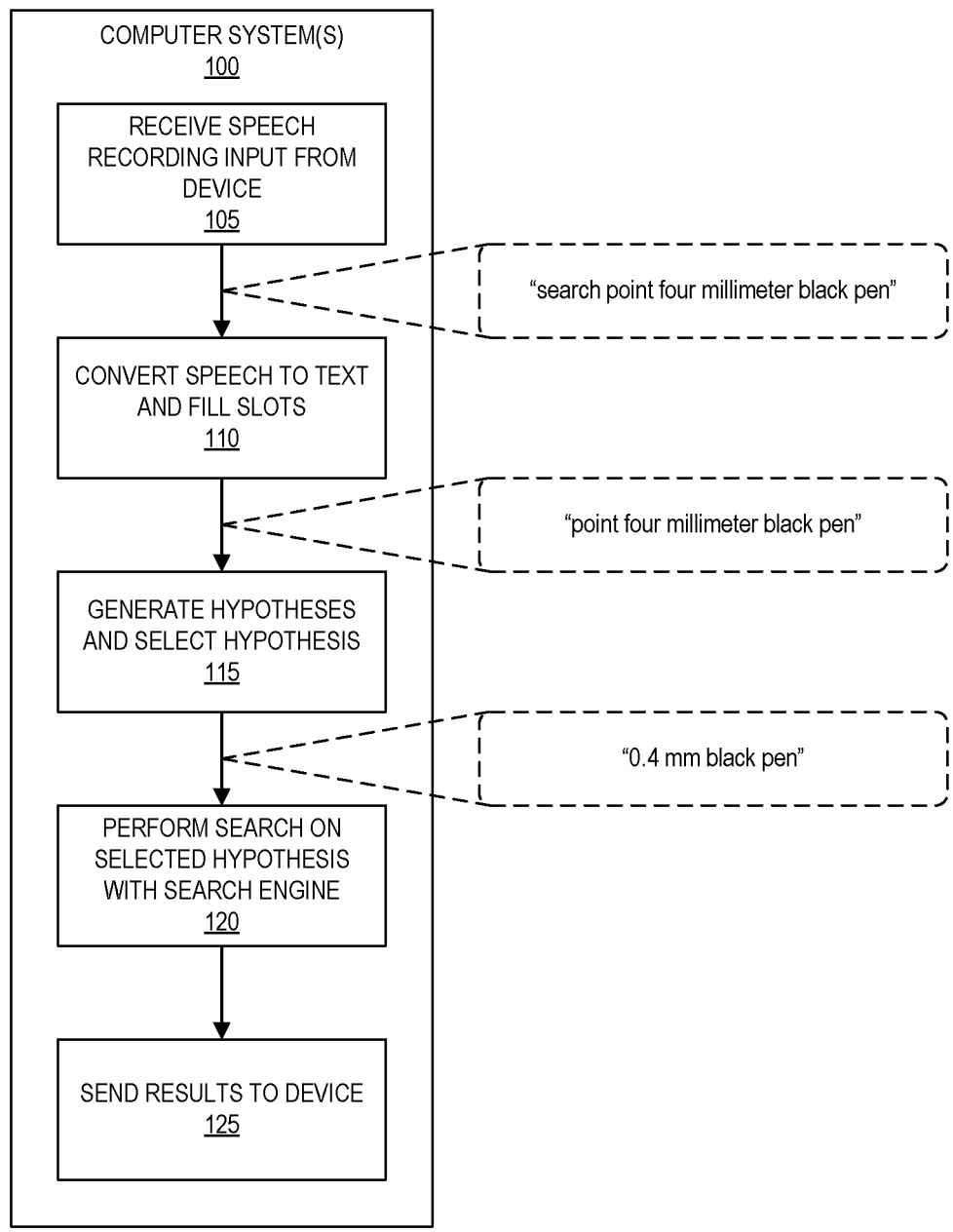
FIG. 1 illustrates an exemplary overview of speech-to-text hypothesis generation and hypothesis selection according to some embodiments.

FIG. 1 illustrates an exemplary overview of speech-to-text hypothesis generation and hypothesis selection according to some embodiments. At block 105, a computer system receives a speech recording input from a device such as a smart phone, in-home assistant, or other device having a voice-enabled interface. For example, an audio recording in a suitable format may contain the spoken form of the statement "search point four millimeter black pen." At block 110, the computer system converts the spoken form of the statement into a text form using speech recognition techniques (also referred to as speech-to-text and automated speech recognition). Various known speech recognition techniques can be used, such as those that use Hidden Markov Models, neural networks, or other techniques to convert from a voice to text. The computer system can analyze the text to determine the intent of command or request. For example, some commands might be to search for a particular item for purchase, while other commands might seek directions to a location, request that a song be played, etc. The command intent may be based on a keyword or key phrase in a portion of the text (e.g., the keyword "search" or "play" at the beginning of the text) that matches some set of supported commands (sometimes referred to as intents). Commands may be associated with various intent archetypes indicating the operands (sometimes referred to as slots) used to carry out the command (e.g., a directions intent might require a destination address operand while a product search intent might require an item name operand). In this example, the computer system analyzes the text to determine that the command is a product search type with an item name operand of "point four millimeter black pen." At block 115, the computer system generates hypotheses for the operand using, for example, finite state transducer (FST) transformations on the text. FST or other transforms can yield several alternatives to the text "point four millimeter black pen" (e.g., "0.4 mm black pen," "0.4 millimeter black pin," "point-four mm black pen," etc.). The computer system selects a hypothesis from the multiple hypotheses using a language model. The language model can be trained using other written form queries to determine probabilities of sequences of characters or words that appear in a hypothesis being scored. Hypotheses that more closely align with prior queries can yield higher scores than those that do not. At block 120, the computer system carries out the command—here a search—on the selected hypothesis and, at block 125, sends the result(s) to, for example, the device that sent the speech recording input. In some embodiments, the result(s) are generated or converted into a form suitable for the device's capabilities prior to sending them. For example, if the device does not have a display but has a speaker, the results can be sent as a synthesized voice recording for playback (e.g., using text-to-speech techniques) for playback by the device. Similarly, if the device has a display, the results can be sent in a format suitable for an application executing on the device to display them (e.g., HTML, JSON, XML, etc.). The above described operations can be implemented by software, firmware, or hardware components, or some combination thereof, by one or more computer systems 100.

Figure 2:
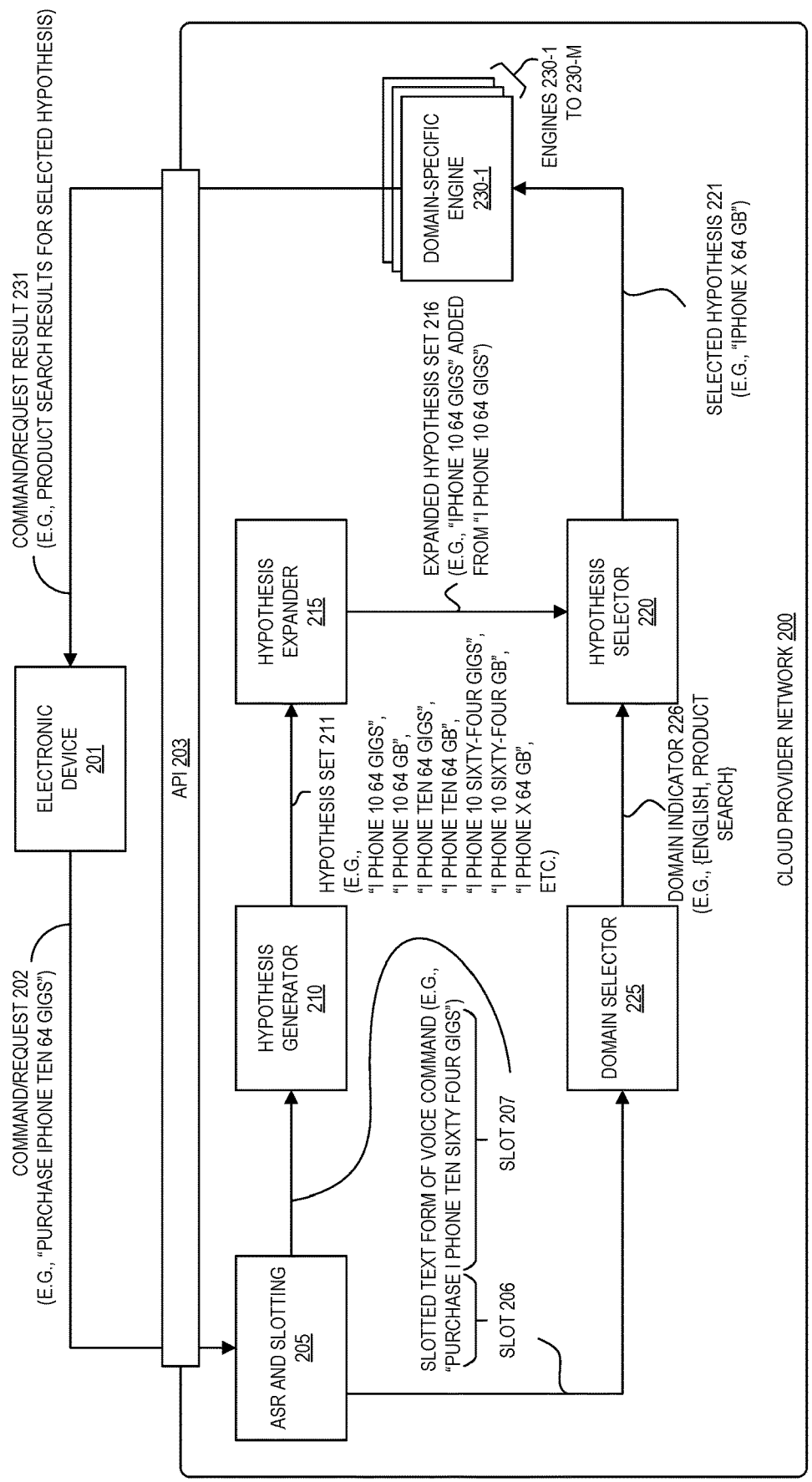
FIG. 2 illustrates an example environment for speech-to-text hypothesis generation and hypothesis selection according to some embodiments.

FIG. 2 illustrates an example environment for speech-to-text hypothesis generation and hypothesis selection according to some embodiments. As illustrated, an electronic device 201 communicates with a cloud provider network 200 through an application programming interface (API) 203. The communications between the electronic device 201 and the cloud provider network 200 may traverse one or more intermediate networks, such as the internet. The electronic device 201 sends a voice recording containing a command or request 202 to the cloud provider network 200 via the API 203 and receives a result 231 (e.g., a list of search results, a streamed media file for playback, etc.). Exemplary electronic devices 201 include personal computers, cellular phones, home assistant devices, and the like, generally including a processor, memory, microphone, and network connection via which to capture audio recordings of user commands or requests and transmit those recordings to the cloud provider network 200 via the API 203.

A cloud provider network 200 (or just "cloud") refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands or workloads. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Here, the cloud provider network 200 can provide backend support for voice-enabled applications executing on electronic devices 201. The cloud provider network 200 includes an automated speech recognition (ASR) and slotting 205 component, a hypothesis generator 210 component, a hypothesis expander 215 component, a hypothesis selector 220 component, a domain selector 225 component, and domain-specific engine(s) 230-1 through 230-M where M is a number of domain-specific engines. Each of the components can be implemented by software, firmware, or hardware components, or some combination thereof, by one or more computer systems of the cloud provider network 200.

The ASR and slotting 205 component receives the command or request 202 from the electronic device 201 via the API 203. Using techniques known to those of skill in the art, the ASR and slotting 205 component converts the spoken-form of the command into a text- or written-form. Additionally, the ASR and slotting 205 component parses the text-form command into relevant operands (sometimes referred to as slots). Based on various keywords or key phrases, the ASR and slotting 205 component can associate command archetypes with commands, a command archetype indicating the operands used to carry out the command (e.g., a directions command might require a destination address operand while a product search command might require an item name operand). As shown, the ASR and slotting 205 component identifies a slot 206 that includes the "PURCHASE" keyword and a slot 207 that includes the phrase "I PHONE TEN SIXTY FOUR GIGS."

The hypothesis generator 210 component receives text inputs (e.g., strings) corresponding to slots from the ASR and slotting 205 component and, for each text input, generates zero or more hypotheses that form a hypothesis set 211. For example, for the slot 207 containing the text "I PHONE TEN SIXTY FOUR GIGS," the hypothesis generator 210 can generate a set of hypotheses 211 including "I PHONE 10 64 GIGS", "I PHONE 10 64 GB", "I PHONE TEN 64 GIGS", "I PHONE TEN 64 GB", "I PHONE 10 SIXTY-FOUR GIGS", "I PHONE 10 SIXTY-FOUR GB", "I PHONE X 64 GB", and so on. Additional detail on the hypothesis generator 210 component are provided with reference to FIG. 3.

In some embodiments, the hypothesis expander 215 component expands the hypothesis set 211 to form an expanded hypothesis set 216. The hypothesis expander 215 can include a set of rules (e.g., regular expressions) to perform various concatenation and other text-based operations. For example, upon receipt of a hypothesis "I PHONE 10 64 GIGS," the hypothesis expander 215 component can generate hypotheses "IPHONE 10 64 GIGS" and "I PHONE 1064 GIGS" by concatenating sequential words or numbers. The expanded hypothesis set 216 would include all three hypotheses.

The hypothesis selector 220 component selects a hypothesis 221 from a set of hypotheses for use by a downstream domain-specific engine(s) 230 that processes the user's command or request 202. As illustrated, the hypothesis selector 220 receives the expanded hypothesis set 216 from the hypothesis expander 215. In other embodiments, the hypothesis selector 220 receives the hypothesis set 211 from the hypothesis generator 210. At a high level, the hypothesis selector 220 uses a language model to score and select the highest scoring hypothesis from a set. In some embodiments, multiple language models may be present for different types of requests (e.g., play a song versus search for a term; English versus Chinese language requests, etc.). The hypothesis selector 220 can receive an indication of the language model to use, e.g., a domain indicator 226 from the domain selector 225 component. Additionally, the hypothesis selector 220 can select which downstream domain-specific engine(s) 230 to send the text of the selected hypothesis 221 to based on the domain indicator 226. In this example, the hypothesis selector 220 component might select the hypothesis "IPHONE X 64 GB" and send it to an engine 230 for product search. Additional detail on the hypothesis generator 210 component are provided with reference to FIG. 3.

The domain selector 225 component can evaluate all or a portion of the text form of the command or request 202 to output a domain indicator 226 that identifies various characteristics about the command or request 202 (e.g., language, domain, etc.). As illustrated, the domain selector 225 receives slot 206 from the ASR and slotting component 205 that includes the English word "purchase." By comparing the received text to one or more domains, the domain selector 225 can identify the relevant domain and send a domain indicator 226 to the hypothesis selector 220. For example, by receiving the English word "purchase," the domain selector might provide a domain indicator 226 that includes an indication of the language and type of request (i.e., "English" and "Product Search").

The domain-specific engine(s) 230 provide results to the command or request 202. For example, one engine might be a product search engine. Another engine might be a music engine that searches for and plays songs. Another engine might be a navigation engine that prepares a set of directions for navigating from one location to another location. Using the selected hypothesis 221 as an input, a domain-specific engine(s) 230 generates a result and sends the result to the electronic device 201. Such a result might be a list of products from a product search, the beginning of a media stream for a media request, etc.

The hypothesis selector 220 component can use different language models trained for particular domains. For example, a user's spoken-form query might include the phrase "nine inch nails." If the query is in the music domain, a language model trained for the music domain might select the hypothesis "nine inch nails" (to reflect the music group Nine Inch Nails). Conversely, if the query is in the product domain, a language trained for the product domain might select a hypothesis "9 in. nails" (to reflect the fasteners).

Note that in some embodiments, the speech recognition and/or slotting tasks may be offloaded to a local component (not shown) executed by the electronic device 201. Instead of sending a voice recording with a spoken form command or request 202, the electronic device may send the text or slot output from the local component as a command or request 202. Additionally, in some embodiments, one or more of the hypothesis generator 210 component, the hypothesis expander 215 component, the domain selector component 225, and the hypothesis selector 220 component may be executed by the electronic device 201. For example, the electronic device 201 can process a voice command or request to the point where it determines a hypothesis to submit to a domain-specific engine 230 via the API 203.

Figure 3:
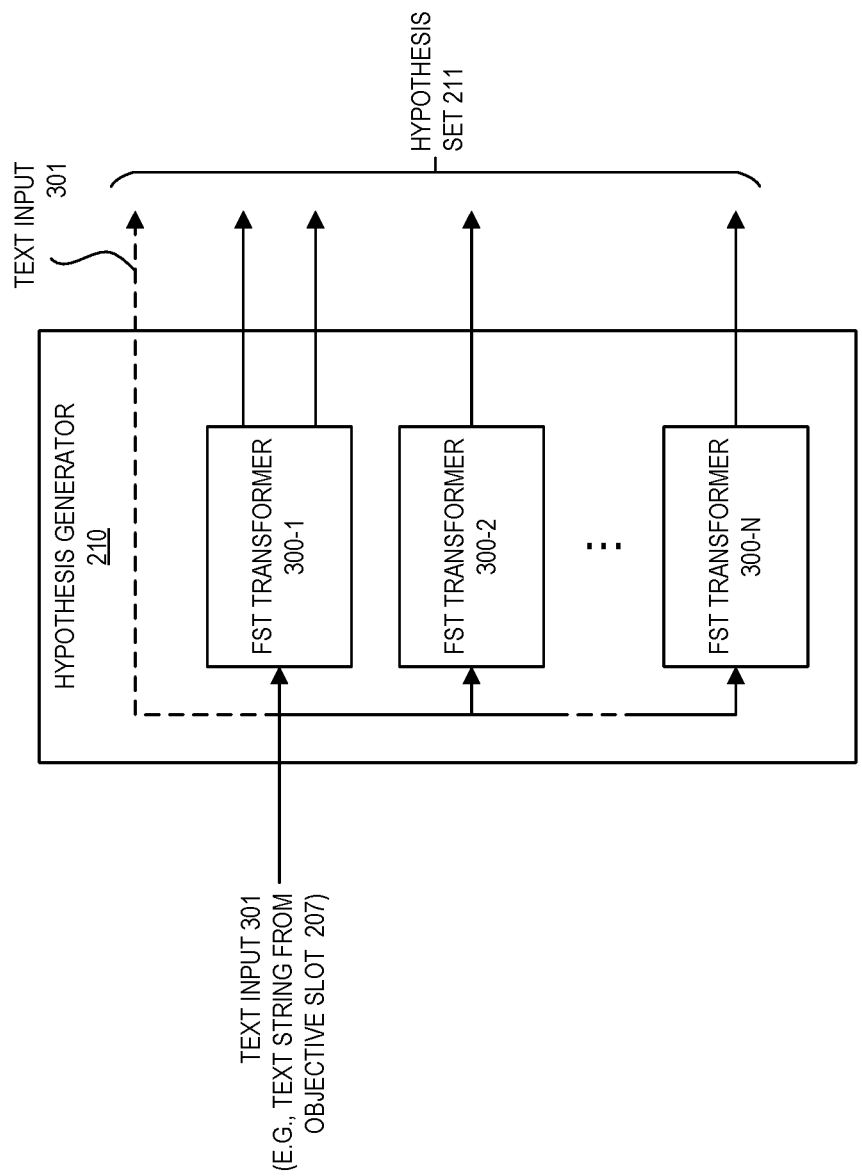
FIG. 3 illustrates an example hypothesis generator according to some embodiments.

FIG. 3 illustrates an example hypothesis generator according to some embodiments. As illustrated, the hypothesis generator 210 component receives a text input 301 (e.g., from the ASR and slotting 205 component) and outputs a set of hypotheses 211.

The hypothesis generator 210 includes FST transformers 300-1 through 300-N where N is a number of FST transformers. FST transformers 300 operate on an input text and generate an output text. Common transformations include numbers (e.g., "eight" to "8"), duplications (e.g., "triple a" to "aaa"), acronyms (e.g., "as soon as possible" to "ASAP"), and units of measure (e.g., "ounce" to "oz."). For example, one FST transformer might transform the sequence of characters "ten" in the text input 301 to the decimal form "10" in a first hypothesis, while another FST transformer might transform the same sequence to the roman numeral form "X" in a second hypothesis.

FST transformers 300 can output a single hypothesis or multiple hypotheses (e.g., FST transformer 300-1 is illustrated as outputting two hypotheses while FST transformer 300-2 is illustrated as outputting one hypothesis). For example, one FST transformer might handle units of distance measure converting the text input "inch" to the text output "inch," the abbreviated text output "in.," and to the symbolic text output """.

Although the hypothesis generator 210 is illustrated as having multiple FST transformers 300 in parallel, other embodiments may chain two or more FST transformers serially to provide additional permutations to the text input 301 as hypotheses in the hypothesis set 211.

The set of hypotheses 211 can include the text input 301 in original form. This is because the written form of the spoken command from the ASR and slotting 205 component can be included as a valid hypothesis for evaluation by the hypothesis selector 220 component.

Figure 4:
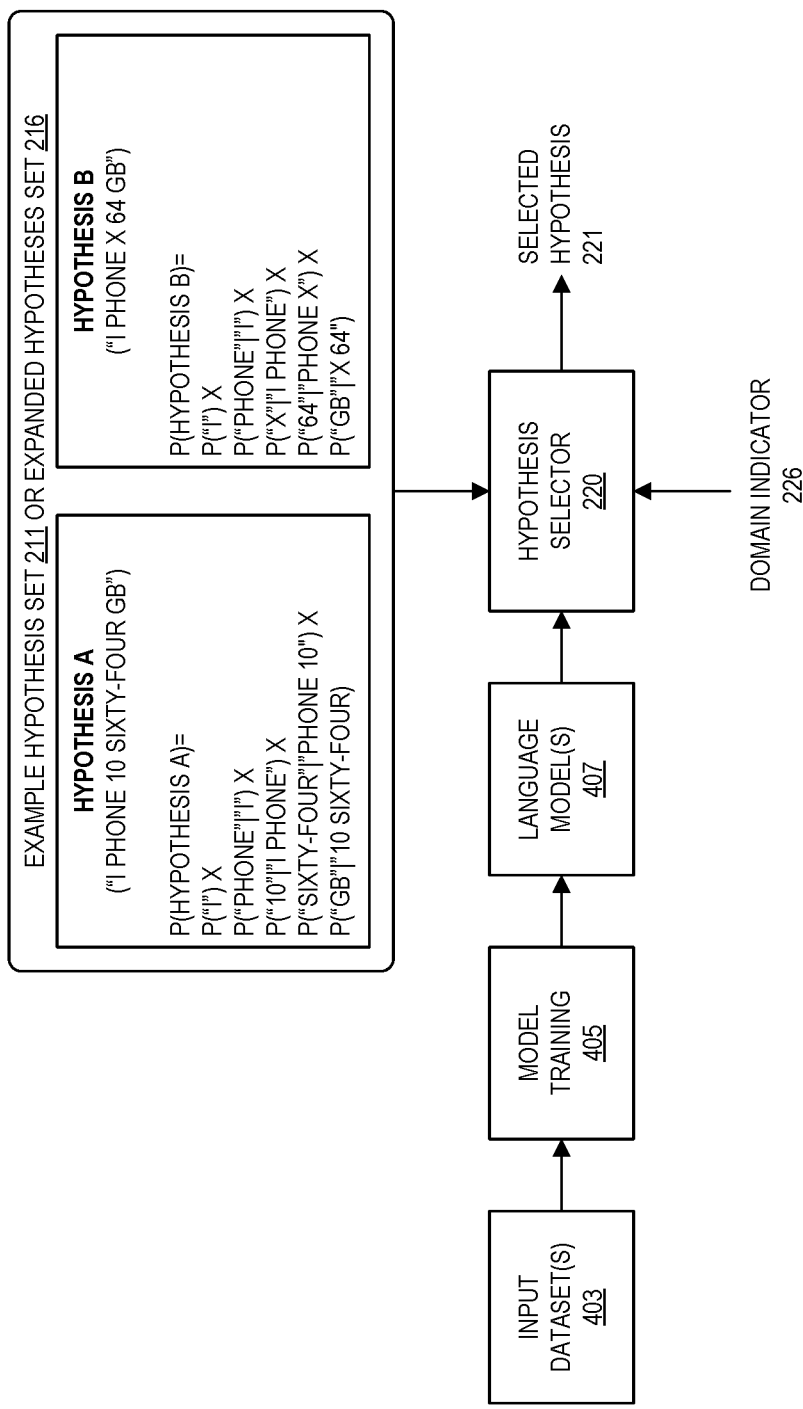
FIG. 4 illustrates an example hypothesis selector according to some embodiments.

FIG. 4 illustrates an example hypothesis selector according to some embodiments. To select a hypothesis from the set of hypotheses, the hypothesis selector 220 component can evaluate each hypothesis in the set 211 (or 216) using a language model 407. A given hypothesis is represented as a sequence of words or characters $w_1, \ldots, w_m$. Sequences of words (or characters) can be scored using the language model such that sequences having a higher probability under the language model will have a higher score. For example, in common usage, the word sequence of the text "the cat jumped over the dog" includes "the," followed by "cat," followed by "jumped," and so on (the character sequence would be "t," followed by "h," followed by "e," and so on). Such a sequence is more likely given a language model trained with common English texts than a sequence like "yellow reindeer oyster." An exemplary language model is the Katz back-off n-gram language model. Under that model, the score for a given hypothesis is given by the following equation.

$$P(w_1, \ldots, w_m) = \prod_{i=1}^{m} P(w_i | w_1, \ldots, w_{i-1}) \quad \text{(Eq. 1)}$$

where $P(w_1, \ldots, w_m)$ is the probability of the sequence of m words (or characters) estimated as the product of the probability of a word (or character) $w_i$ given the prior sequence of words (or characters) $(w_i | w_1, \ldots, w_{i-1})$. Using n to window the model to the sub-sequences of n words (or characters), the probability $P(w_1, \ldots, w_m)$ can be estimated using the following equation.

$$P(w_1, \ldots, w_m) \approx \prod_{i=1}^{m} P(w_i | w_{i-(n-1)}, \ldots, w_{i-1}) \quad \text{(Eq. 2)}$$

As illustrated, example hypothesis A corresponds to the text "I PHONE 10 SIXTY-FOUR GB." A word-based Katz back-off 3-gram language model would include probabilities for the word "X" following the words "I PHONE," the word "64" following the words "PHONE X," etc. Using such a model, the score for hypothesis A is given by the following equation.

$P(\text{HYPOTHESIS } A) = P(\text{``I''}) \cdot P(\text{``PHONE''}|\text{``I''}) \cdot P(\text{``10''}|\text{``IPHONE''}) \cdot P(\text{``SIXTY-FOUR''}|\text{``PHONE 10''}) \cdot P(\text{``GB''}|\text{``10SIXTY-FOUR''})$ Example hypothesis B corresponds to the text "I PHONE X 64 GB." Again, using the model, the score for hypothesis B is given by the following equation.

$P(\text{HYPOTHESIS } B) = P(\text{``I''}) \cdot P(\text{``PHONE''}|\text{``I''}) \cdot P(\text{``X''}|\text{``I PHONE''}) \cdot P(\text{``64''}|\text{``PHONE X''}) \cdot P(\text{``GB''}|\text{``X64''})$ Upon calculating the score for each hypothesis in the set 211 (or 216), the hypothesis selector 220 component can select the hypothesis having the highest score and send that selected hypothesis 221 to a downstream component (e.g., an engine 230).

A model training 405 component can train a language model 407 based on an input dataset 403. At a high level, model training involves learning word (or character) sequence probabilities from the input dataset 403. Exemplary input datasets 403 can be formed from users' text-based queries to the domain of interest. For example, in the product search domain, prior text-based search queries from users to a product search engine 230 can be used as the input dataset. Various operations can be used to prepare the dataset prior to training. For example, queries that produced results that a user did not select may be excluded from the dataset. As another example, queries that appeared multiple times may be weighted higher in the dataset.

Other language models can be trained and used, such as those based on deep learning approaches. For example, a long short-term memory (LSTM) or other recurrent neural network (RNN) based model can be trained to score hypotheses.

In some embodiments, multiple language models may be trained and used, each language model trained and used for a different domain. For example, one language model 407 might be used for general search, another for product search, another for music search, and so on. The hypothesis selector 220 component can select the appropriate language model to use for scoring hypotheses based on the domain indicator 226 (e.g., from the domain selector 225 component of FIG. 2). For example, the hypothesis selector 220 component would select a music language model in the event the domain indicator 226 indicated the music domain. In such a case, upon calculating the score for each hypothesis in the set 211 (or 216), the hypothesis selector 220 component can select the hypothesis having the highest score and send that selected hypothesis 221 to a domain-specific engine(s) 230 that corresponds with the domain indicator 226. Continuing with music, the hypothesis selector 220 component would send the selected hypothesis 221 to a music player application, for example. Training and deploying multiple language models for different domains (e.g., spoken languages, types of requests) allows each model to provide more accurate hypothesis selection based on the nuances of the particular context. One language model might be attuned to grocery searches in German, another to musical artists and songs in Mandarin, and another to electronics in English.

Figure 5:
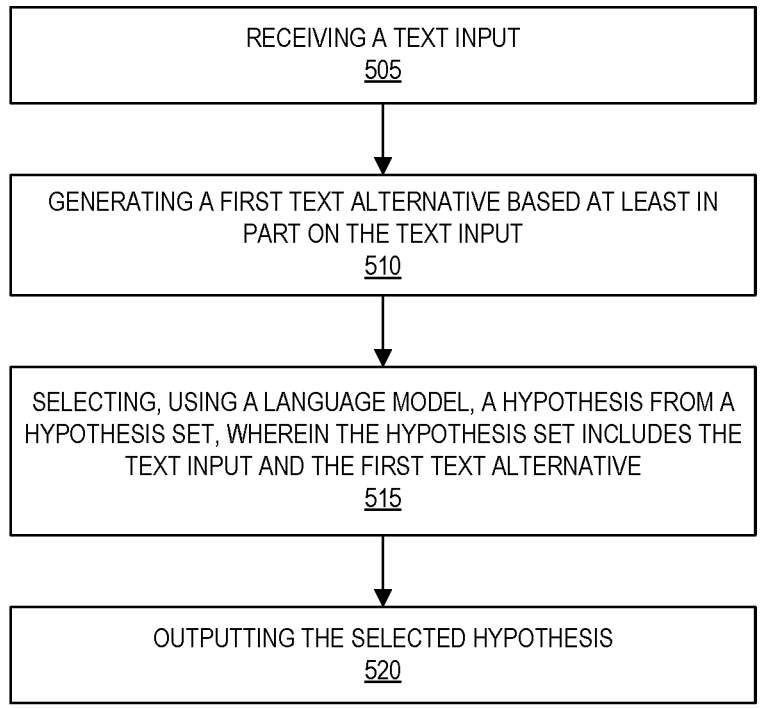
FIG. 5 is a flow diagram illustrating exemplary operations of a method for speech-to-text hypothesis generation and hypothesis selection according to some embodiments.

FIG. 5 is a flow diagram illustrating exemplary operations of a method for speech-to-text hypothesis generation and hypothesis selection according to some embodiments. Some or all of the operations of FIG. 5 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations of FIG. 5 are performed by the hypothesis generator 210, the hypothesis expander 215, the hypothesis selector 220, or another component or some combination thereof of the other figures.

The operations include, at block 505, receiving a text input. For example, an ASR component can generate text from an audio file, such as illustrated in FIG. 2. Such a text input might be "I PHONE TEN SIXTY FOUR GIGS." The operations further include, at block 510, generating a first text alternative based at least in part on the text input. Various techniques can be used to create a text alternative from the text input. For example, the hypothesis generator 210 of FIG. 2 can generate a text alternative using a finite state transducer such as described with reference to FIG. 3. As another example, the hypothesis expander 215 of FIG. 2 can generate a text alternative using various heuristics such as concatenation rules. Continuing the above example, a text alternative to the text input "I PHONE TEN SIXTY FOUR GIGS" could be "I PHONE 10 64 GIGS."

The operations further include, at block 515, selecting, using a language model, a hypothesis from a hypothesis set. The hypothesis set can include the received text input and the generated first text alternative. For example, the hypothesis selector 220 of FIG. 2 can use a language model to score various hypotheses such as the original text input and one or more alternatives to the text input. The language model can include probabilities of sequences of words or characters that can be used to score the hypotheses. For example, the language model can generate a score for a particular hypothesis by calculating the probability of the sequence of words in the hypothesis (e.g., using equation 1 or 2, above). As described with reference to FIG. 4, language models can be trained for a particular domain or context. For example, language models can be trained for different languages (e.g., German, English, etc.) and for different tasks (e.g., searching for a song to play versus a product to purchase). Training of language models typically can be performed by using prior text-based queries submitted to a downstream processing engine such as a domain specific engine 230. In some embodiments, multiple language models may be present, and a domain indicator can be used to select a language model to use for scoring hypothesis from the available language models.

Figure 6:
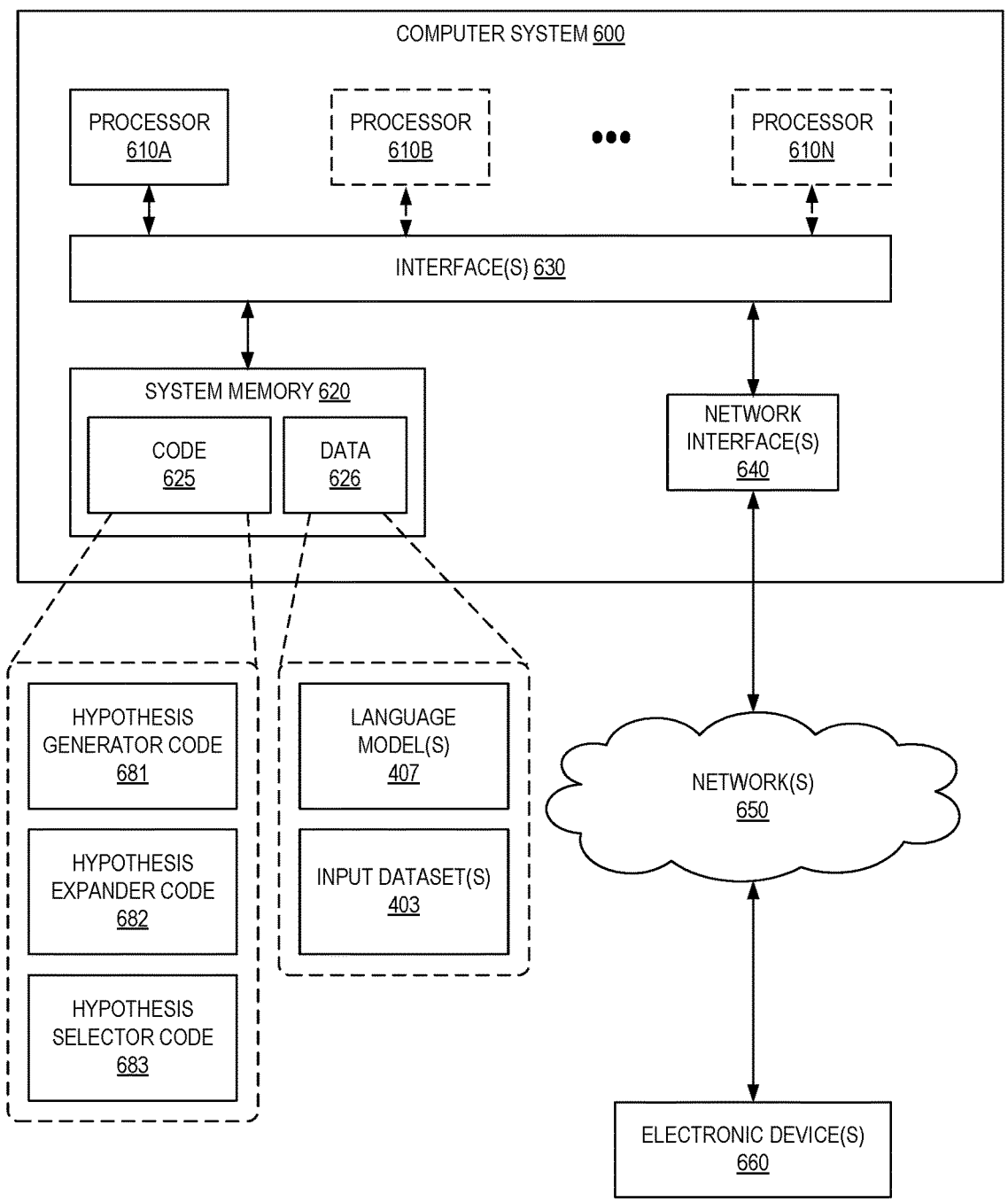
FIG. 6 is a block diagram illustrating an example computer system that may be used in some embodiments.

The operations further include, at block 520, outputting the selected hypothesis. The selected hypothesis can be output to a downstream domain-specific engine 230. One or more results from the domain-specific engine 230 can be sent to a device such as the electronic device 201. The result(s) can be sent in a format tailored to the device—such as an audio file for playback via speaker or in a text-based format for rendering on a display. In some embodiments, a system that implements a portion or all of the techniques described herein may include a general-purpose computer system that includes or is configured to access one or more computer-accessible media, such as computer system 600 illustrated in FIG. 6. In the illustrated embodiment, computer system 600 includes one or more processors 610 coupled to a system memory 620 via an input/output (I/O) interface 630. Computer system 600 further includes a network interface 640 coupled to I/O interface 630. While FIG. 6 shows computer system 600 as a single computing device, in various embodiments a computer system 600 may include one computing device or any number of computing devices configured to work together as a single computer system 600.

In various embodiments, computer system 600 may be a uniprocessor system including one processor 610, or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 610 may commonly, but not necessarily, implement the same ISA.

System memory 620 may store instructions and data accessible by processor(s) 610. In various embodiments, system memory 620 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 620 as code 625 and data 626. For example, code 625 can include hypothesis generator code 681 for the hypothesis generator 210 component, hypothesis expander code 682 for the hypothesis expander 215 component, hypothesis selector code 683 for the hypothesis selector 220 component, or some combination thereof. Data 626 can include language model(s) 407 and/or input dataset(s) 403.

In one embodiment, I/O interface 630 may be configured to coordinate I/O traffic between processor 610, system memory 620, and any peripheral devices in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices 660 attached to a network or networks 650, such as other computer systems or devices as illustrated in FIG. 1, for example. In various embodiments, network interface 640 may support communication via any suitable wired or wireless general data networks, such as types of Ethernet network, for example. Additionally, network interface 640 may support communication via telecommunications/telephony networks such as analog voice networks or digital fiber communications networks, via storage area networks (SANs) such as Fibre Channel SANs, or via I/O any other suitable type of network and/or protocol.

In some embodiments, system memory 620 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 600 via I/O interface 630. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 600 as system memory 620 or another type of memory. Further, a computer-accessible medium may include transmission media or signals such as electrical, electromagnetic, or digital signals, conveyed via a communication medium such as a network and/or a wireless link, such as may be implemented via network interface 640.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, from an electronic device via an application programming interface to a cloud provider network, a voice recording;
receiving, from a speech-to-text component, a text input representing at least part of the voice recording;
generating, using a finite state transducer, a first text alternative based at least in part on the text input by transforming at least a portion of the text input and generating as output the first text alternative, wherein the first text alternative is a first alternative text representation of the at least a portion of the text input and is different from the at least a portion of the text input;
generating a hypothesis set including as hypotheses at least the text input and the first text alternative;
expanding the hypothesis set by applying a set of rules and performing one or more text-based operations on the hypotheses in the hypothesis set, thereby generating an expanded hypothesis set including at least one additional hypothesis;
selecting, using a language model, a hypothesis from the expanded hypothesis set, wherein selecting the hypothesis comprises:
generating, for each hypothesis in the expanded hypothesis set, a score representing a likelihood of a sequence of words contained in the hypothesis using the language model, wherein the language model was trained using a plurality of text queries previously submitted to a search engine to determine probabilities of sequences of words; and
selecting the hypothesis having a score indicating the hypothesis is the most likely hypothesis in the expanded hypothesis set;
sending, to the search engine, the hypothesis having a score indicating the hypothesis is the most likely hypothesis in the expanded hypothesis set;
receiving a result from the search engine; and
sending the result to the electronic device.

2. The computer-implemented method of claim 1, further comprising generating, using a first concatenation rule, a second text alternative from at least one of the text input or the first text alternative, wherein the second text alternative is a second alternative text representation of the at least part of the voice recording and is different from the text input and the first text alternative, and wherein the hypothesis set further includes as a hypothesis the second text alternative.

3. The computer-implemented method of claim 1, further comprising selecting the language model from a plurality of language models based on a domain indicator identified based on the at least part of the voice recording, wherein the domain indicator includes an identification of at least one of a spoken language and a search type.

4. A computer-implemented method comprising:
  receiving a text input representing at least part of a voice recording;
  generating, by a hypothesis generator service of a cloud provider network, a first text alternative based at least in part on the text input by transforming at least a portion of the text input and generating as output the first text alternative, wherein the first text alternative is an alternative text representation of the at least a portion of the text input and is different from the at least a portion of the text input;
  generating, by the hypothesis generator service, a hypothesis set including as hypotheses at least the text input and the first text alternative;
  expanding, by the hypothesis generator service, the hypothesis set by applying a set of rules and performing one or more text-based operations on the hypotheses in the hypothesis set, thereby generating an expanded hypothesis set including at least one additional hypothesis;
  outputting, by the hypothesis generator service, the expanded hypothesis set including as hypotheses at least the text input, the first text alternative, and the at least one additional hypothesis;
  receiving, by a hypothesis selector service of the cloud provider network, the expanded hypothesis set;
  selecting, by the hypothesis selector service, a language model from a plurality of language models based on a domain indicator identified based on the at least part of the voice recording, and wherein the domain indicator includes an identification of at least one of a spoken language and a search type;
  selecting, by the hypothesis selector service using the language model, a hypothesis from the expanded hypothesis set; and
  outputting, by the hypothesis selector service, the hypothesis selected from the expanded hypothesis set.

5. The computer-implemented method of claim 4, wherein the language model includes probabilities for sequences of at least one of words and characters, and wherein the language model was trained using a plurality of text queries previously submitted to a search engine to determine the probabilities of sequences of words that appear in a hypothesis being scored.

6. The computer-implemented method of claim 4, wherein the first text alternative is generated using a finite state transducer.

7. The computer-implemented method of claim 4, further comprising generating, using a first concatenation rule, a second text alternative from at least one of the text input and the first text alternative, wherein the second text alternative is a second alternative text representation of the at least a portion of the text input and is different from the at least a portion of the text input and the first text alternative, and wherein the hypothesis set further includes as a hypothesis the second text alternative.

8. The computer-implemented method of claim 4, wherein selecting the hypothesis from the expanded hypothesis set comprises:
  generating, for each hypothesis in the expanded hypothesis set, a score representing a likelihood of a sequence of at least one of words and characters contained in the hypothesis using the language model; and
  selecting the hypothesis having a score indicating the hypothesis is the most likely hypothesis in the expanded hypothesis set.

9. The computer-implemented method of claim 4, further comprising selecting the language model from a plurality of language models based on a domain indicator identified based on the at least part of the voice recording, and wherein the domain indicator includes an identification of at least one of a spoken language and a search type.

10. The computer-implemented method of claim 4, wherein the voice recording is received from an electronic device via an application programming interface to a cloud provider network.

11. The computer-implemented method of claim 10, wherein the hypothesis selected from the expanded hypothesis set is output to a search engine.

12. The computer-implemented method of claim 11, further comprising sending a result from the search engine to the electronic device, wherein the result is in at least one of a text format and an audio format.

13. A system comprising:
  a hypothesis generator service implemented by a first one or more electronic devices of a cloud provider network, the hypothesis generator service including instructions that upon execution cause the hypothesis generator service to:
    generate a first text alternative based at least in part on a received text input by transforming at least a portion of the text input and generating as output the first text alternative, wherein the received text input represents at least part of a voice recording, wherein the first text alternative is an alternative text representation of the at least a portion of the text input and is different from the at least a portion of the text input; and
    generate a hypothesis set including as hypotheses at least the received text input and the first text alternative;
    expand the hypothesis set by applying a set of rules and performing one or more text-based operations on the hypotheses in the hypothesis set, thereby generating an expanded hypothesis set including at least one additional hypothesis;
    output the expanded hypothesis set including as hypotheses at least the received text input, the first text alternative, and the at least one additional hypothesis; and
  a hypothesis selector service implemented by a second one or more electronic devices of the cloud provider network, the hypothesis selector service including instructions that upon execution cause the hypothesis selector service to:
    receive the expanded hypothesis set;
    select, using a language model, a hypothesis from the expanded hypothesis set; and
    output the hypothesis selected from the expanded hypothesis set, wherein the language model includes probabilities for sequences of at least one of words and characters, and wherein the language model was trained using a plurality of text queries previously submitted to a search engine to determine the probabilities of sequences of words that appear in a hypothesis being scored.

14. The system of claim 13, further comprising an automated speech recognition (ASR) and slotting component including instructions that upon execution cause the ASR and slotting component to receive the voice recording, the voice recording including a spoken-form command, and convert the spoken-form command into the text input.

15. The system of claim 13, wherein the first text alternative is generated using a finite state transducer.

16. The system of claim 13, wherein the hypothesis set further includes as hypotheses a second text alternative, wherein the second text alternative is a second alternative text representation of the at least a portion of the text input and is different from the at least a portion of the text input and the first text alternative, and wherein the second text alternative is generated using a first concatenation rule applied to at least one of the received text input and the first text alternative.

17. The system of claim 13, wherein to select the hypothesis from the hypothesis set, the hypothesis selector service includes further instructions that upon execution cause the hypothesis selector service to:
generate, for each hypothesis in the expanded hypothesis set, a score representing a likelihood of a sequence of at least one of words and characters contained in the hypothesis using the language model; and
select the hypothesis having a score indicating the hypothesis is the most likely hypothesis in the expanded hypothesis set.

18. The system of claim 13, wherein the hypothesis selector service includes further instructions that upon execution cause the hypothesis selector service to select the language model from a plurality of language models based on a domain indicator identified based on the at least part of the voice recording, and wherein the domain indicator includes an identification of at least one of a spoken language and a search type.

19. The system of claim 13, wherein the voice recording is received from an electronic device via an application programming interface to the cloud provider network.

20. The system of claim 19, wherein the selected hypothesis is output to the search engine, and wherein a result from the search engine is sent to the electronic device, wherein the result is in at least one of a text format and an audio format.

\* \* \* \* \*